US007376708B2

(12) United States Patent
Zubeldia et al.

(10) Patent No.: US 7,376,708 B2
(45) Date of Patent: May 20, 2008

(54) SYSTEMS AND METHODS RELATING TO THE ESTABLISHMENT OF EDI TRADING PARTNER RELATIONSHIPS

(75) Inventors: Pedro Zubeldia, Kaysville, UT (US); Travis Stockwell, Riverton, UT (US); Jeff Compas, Lehi, UT (US)

(73) Assignee: Claredi Corporation, Kaysville, UT (US)

( * ) Notice: Subject to any disclaimer, the term of this patent is extended or adjusted under 35 U.S.C. 154(b) by 988 days.

(21) Appl. No.: 10/062,980

(22) Filed: Jan. 31, 2002

(65) Prior Publication Data

US 2003/0144967 A1 Jul. 31, 2003

(51) Int. Cl.
G06F 15/16 (2006.01)
G06F 17/30 (2006.01)

(52) U.S. Cl. .............................. 709/208; 726/2; 726/3; 726/4

(58) Field of Classification Search ................ 709/208, 709/206; 379/15.02, 111, 22, 379; 705/1, 705/3; 382/149, 144
See application file for complete search history.

(56) References Cited

U.S. PATENT DOCUMENTS

| 5,265,164 | A | 11/1993 | Matyas et al. |
| 5,274,547 | A | 12/1993 | Zoffel et al. |
| 5,664,109 | A | 9/1997 | Johnson et al. |
| 6,209,091 | B1 | 3/2001 | Sudia et al. |
| 6,292,795 | B1 | 9/2001 | Peters et al. |
| 6,301,589 | B1 | 10/2001 | Nakamura et al. |
| 6,311,178 | B1 | 10/2001 | Bi et al. |
| 6,324,516 | B1 | 11/2001 | Shults et al. |
| 7,062,081 | B2* | 6/2006 | Shimoda et al. ............. 382/149 |
| 2002/0010679 | A1* | 1/2002 | Felsher ......................... 705/51 |
| 2002/0138582 | A1* | 9/2002 | Chandra et al. ............. 709/206 |
| 2002/0184527 | A1* | 12/2002 | Chun et al. .................. 713/201 |
| 2003/0086536 | A1* | 5/2003 | Salzberg et al. ......... 379/15.02 |

OTHER PUBLICATIONS

"ASCX12"—The Accredited Standards Committee, http://64.233.161.104/search?q=cache:HSnsNom1ZacJ:www.x12.org/+ASC+X12+EDI&hl=en&gl=us&ct=clnk&cd=1; Google, no date found.*

* cited by examiner

Primary Examiner—David Wiley
Assistant Examiner—Jude J Jean-Gilles
(74) Attorney, Agent, or Firm—TraskBritt

(57) ABSTRACT

Systems and methods relating to the establishment of EDI trading partner relationships. Sending partners convey a series of data transmissions to a computer system, where they are checked for internal consistency and compliance with applicable trading rules. Data attributes extracted from the transmissions allow the capabilities of the sending system to be ascertained. Differing senders meeting different appropriate qualifications may be issued specific certifications. Receiving partners conveyed a series of EDI transmissions by a third party report the results of receipt and analysis back thereto. From the reported results, the capabilities and accuracy of the receiving system are ascertained. Specific certifications for differing types of receiving partners may then be issued. Trading partners may be matched by capabilities. A directory of trading partner certifications and capabilities may be periodically replicated to selected users. The directory may contain a secure password, allowing users therein to securely identify one another.

77 Claims, 5 Drawing Sheets

SYSTEMS AND METHODS RELATING TO THE ESTABLISHMENT OF EDI TRADING PARTNER RELATIONSHIPS

FIELD OF THE INVENTION

The present invention is directed to systems and methods related to establishing EDI trading partner relationships. One embodiment of the present invention provides methods and systems for examining EDI transmission and reception capabilities. This may be accomplished by using a computer testing system accessible over a network connection with an examination database stored in a memory thereon to carry out the methods described herein.

BACKGROUND OF THE INVENTION

It has become increasingly common for business entities to exchange data in electronic form. The use of e-mail and the Internet to communicate has allowed commerce to proceed at a much faster pace and for cost savings to be realized from the speed involved and the smaller number of people needed to pass communications. Specialized data communication between trading partners, such as a manufacturing company and its suppliers, typically requires the set up and maintenance of a distinct and proprietary data exchange system. Setting up these proprietary systems has enabled cost savings to be realized, but requires each pair of trading partners to spend time programming, testing, debugging and converting data in their systems at each end. The debugging process may be further complicated as occurrence of an error may require systems to be modified on each end. Where an entity has a number of trading partners, such as a distributor receiving orders from a number of retailers, this process has to be repeated for each trading partner added to the system.

There have been attempts to standardize the interchange of electronic data, such as the American National Standards Institute (ANSI) Accredited Standards Committee (ASC) X12 that develops uniform standards for electronic interchange of business transactions—electronic data interchange (EDI). While the adoption of common standards has simplified the process of selecting and implementing EDI systems, the testing and debugging process still requires the large investment of time and effort on each side.

While some health care providers currently use EDI transactions to achieve cost savings in transactions, there is no currently implemented standard format. Currently, about 400 different EDI formats are being used in the health care area. The Health Insurance Portability and Accountability Act (HIPAA), enacted in 1996, requires U.S.-based health care providers, clearinghouses, claims processors and payers to transmit claims and other health care transactions using a set of common EDI standards. These national standards were proposed in Federal Register Vol. 63, No. 88, page 25272, et seq., Health Insurance Reform: Standards for Electronic Transactions and adopted in 45 CFR Parts 160 and 162, as published in the Federal Register Vol. 65, No. 160, pages 50312 to 50372, Health Insurance Reform: Standards for Electronic Transactions, each of which is incorporated in its entirety herein. Addenda and clarifications to these rules are produced by the process contained in Federal Register Vol. 65, No. 160, page 50373, Health Insurance Reform Announcement of Designated Maintenance Standards Organizations and Federal Register, Vol. 65, No. 227, each of which is incorporated by reference in its entirety herein. A number of X12 Implementation guides have been developed and are available from the ASC X12 committee, setting and detailing the specific standards for the different aspects of the health care industry and the implementation of their adoption by all health care providers. Some of these implementation guidelines have been adopted by the Secretary of Health and Human Services as HIPAA Standard transactions, while other guides are for voluntary adoption by the healthcare industry and may be adopted by the Secretary of HHS at a later time. These implementation guides include National Electronic Data Interchange Transaction Set Implementation Guide, Health Care Claim Request for Additional Information 277; National Electronic Data Interchange Transaction Set Implementation Guide, Health Care Data Element Dictionary, May 2000; Logical Observation Identifier Names and Codes (LOINC®) Committee, LOINC® Modifier Codes For Use With ASC X12N 277 Implementation Guides when Requesting Additional Information, NPRM Draft Dec. 10, 2001; National Electronic Data Interchange Transaction Set Implementation Guide, Payroll Deducted and Other Group Premium Payment for Insurance Products 820, ASC X12N 820 (004010X061), May 2000; National Electronic Data Interchange Transaction Set Implementation Guide, Payroll Deducted and Other Group Premium Payment For Insurance Products 820 ADDENDA, ASC X12N 820 (004010X061A1); National Electronic Data Interchange Transaction Set Implementation Guide, Health Care Claim Payment/Advice 835, ASC X12N 835 (004010X091), May 2000; National Electronic Data Interchange Transaction Set Implementation Guide, Health Care Claim Payment/Advice 835 ADDENDA, ASC X12N 835 (004010X091A1); National Electronic Data Interchange Transaction Set Implementation Guide, Health Care Eligibility Benefit Inquiry and Response 270/271, ASC X12N 270/271 (004010X092), May 2000; National Electronic Data Interchange Transaction Set Implementation Guide, Health Care Eligibility Benefit Inquiry and Response 270/271 ADDENDA, ASC X12N 270/271 (004010X092A1), October 2001 NPRM Draft; National Electronic Data Interchange Transaction Set Implementation Guide, Health Care Claim Status Request and Response 276/277, ASC X12N 276/277 (004010X093); National Electronic Data Interchange Transaction Set Implementation Guide, Health Care Claim Status Request and Response 276/277 ADDENDA, ASC X12N 276/277 (004010X093A1); National Electronic Data Interchange Transaction Set Implementation Guide, Health Care Services Review—Request for Review and Response 278 ASC X12N 278 (004010X094), May 2000; National Electronic Data Interchange Transaction Set Implementation Guide, Health Care Services Review—Request for Review and Response 278 ADDENDA, ASC X12N 278 (004010X094A1); National Electronic Data Interchange Transaction Set Implementation Guide, Benefit Enrollment and Maintenance 834, ASC X12N 834 (004010X095), May 2000; National Electronic Data Interchange Transaction Set Implementation Guide, Benefit Enrollment and Maintenance 834 ADDENDA, ASC X12N 834 (004010X095A1); National Electronic Data Interchange Transaction Set Implementation Guide, Health Care Claim: Institutional, 837, ASC X12N 837 (004010X096), May 2000; National Electronic Data Interchange Transaction Set Implementation Guide, Health Care Claim: Institutional, 837 ADDENDA, ASC X12N 837 (004010X096A1); National Electronic Data Interchange Transaction Set Implementation Guide, Health Care Claim: Dental, 837 ASC X12N 837 (004010X097), May 2000; National Electronic Data Interchange Transaction Set Implementation Guide, Health Care Claim: Dental, 837 ADDENDA, ASC X12N 837 (004010X097A1); National Electronic Data Interchange Transaction Set Implementation Guide, Health Care Claim: Professional, 837 ASC X12N 837 (004010X098), May 2000; National Electronic Data Interchange Transaction Set Implementation Guide, Health Care Claim: Professional, 837 ADDENDA, ASC X12N 837 (004010X098A1); NCPDP Telecommunication Standard Format, Version 5.1 and the NCPDP Batch Standard, Version 1 Release 0; each of which is incorporated herein by reference in its entirety.

It is estimated that once the standards are adopted, the costs of processing each transaction will drop from $5 to $15 per paper or telephone transaction to $0.85 to $1.25 per standardized EDI transaction. Adoption of similar standards in other fields should have the same effect.

The traditional method of setting up an EDI transaction system is to set a pair of "trading partners" up and convey test messages back and forth between partners, troubleshooting at each end until the system successfully works. Personnel are required at each end and disputes as to which system is the cause of errors are common. This process must be repeated for each pair of trading partners and for each type of transaction to be exchanged. Where there are multiple trading partners, changes made to a system in response to problems with one trading partner may result in problems occurring in transactions with other trading partners. With the sheer numbers of computer systems involved in the medical field, this task may prove almost insurmountable by the October 2003 HIPAA deadline.

There has been software available that is capable of analyzing data files for proper syntax and formatting for ASC X12 or other EDI standards, such as the EDIFECS software, or the EDISIM analyzer software program from Foresight Corporation. Generally, this software has been limited to format checking and conformance to the X12 syntax, and merely serves as an initial tool in the troubleshooting process. The contents of transmissions are not analyzed for business sensibility of the data in the transactions or for proper relationships between different transactions. A file with the proper format that makes no business sense is essentially worthless. System and methods able to analyze the contents of a transmission, including the business contents, and provide independent troubleshooting of the data stream for EDI trading partners would be advantageous.

SUMMARY OF THE INVENTION

The present invention is directed to systems and methods for testing and verifying the EDI transactions of trading partners. Transmission capabilities and proper representation of the business content are examined as a sending partner conveys a series of data transmissions to a computer system for analysis of the data stream. The transmissions are checked for internal consistency, completeness of necessary business elements, and compliance with applicable trading partner data requirements and business rules. Data attributes are extracted from the transmissions to ascertain and compile the EDI capabilities of the sending system, as represented by the data in the transmission stream itself. As a series of compliant transmissions are received and analyzed, the partner may be verified for the transmission of EDI interchanges not only according to the proper format but also in accordance with the necessary content requirements and business rules of the intended recipient. Senders meeting different appropriate qualifications may be issued specific certifications for those qualifications.

The capability to receive EDI transmissions may be examined as receiving partners are conveyed a set of test EDI transmissions. Once the EDI transmissions are received and processed, the results of processing the test transmissions are reported back to the party that prepared these transmissions by responding to enquiries related to the data contained in the test transmissions. From the responses, the capabilities and accuracy of the receiving system may be ascertained. Certifications for differing types of receiving partners and their specific receiving capabilities may then be issued.

EDI trading partners may be matched by their transmission and reception capabilities and certifications. A directory of trading partners may be maintained and updated versions provided to participating partners. The directory may include cryptographically hashed passwords, allowing a single password for each user to be securely provided to each trading partner.

DETAILED DESCRIPTION OF THE INVENTION

The present invention provides methods and systems for examining EDI transmission and reception capabilities. In one embodiment, the present invention makes use of a computer testing system accessible over a network and an examination database stored in a memory thereon to carry out the methods described herein.

It will be appreciated by those skilled in the art that the embodiments of the present invention herein described while illustrating certain embodiments are not intended to be limiting and that various combinations or modifications of the embodiments of the present invention could be made without departing from the scope of the invention. For example, the methods described herein are applicable to traditional EDI as well as to XML or any other electronic data exchange mechanisms.

Figure 1:
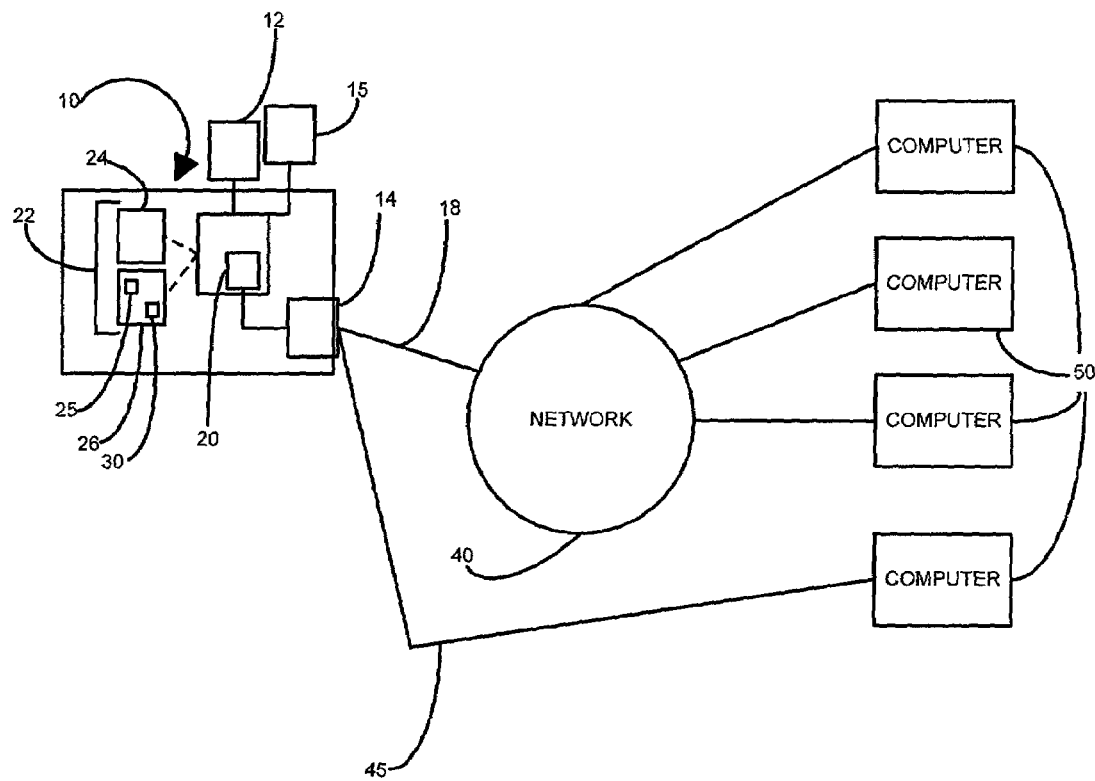
FIG. 1 is a box diagram illustrating one possible embodiment of a testing computer system in accordance with one aspect of the present invention.

Referring to drawing FIG. 1, one possible embodiment of a system for examining EDI transmissions is depicted, including computer system 10 for carrying out the methods of the present invention. It will be appreciated that although computer system 10 is depicted as a single computer for simplicity, any number of different computers acting either independently or as a single system for carrying out one or more of the processes or methods described herein may be used and are within the scope of the present invention. Computer system 10 may include or function as a Web interfacing system (e.g., a Web server) for enabling access and interaction with other devices linked to local and external communication networks ("networks"), including the World Wide Web (the "Internet"), a local area network (LAN), a wide area network (WAN), an intranet, the computer network of an online service, etc. Computer system 10 optionally may include one or more local displays 15, which may comprise a conventional monitor, a monitor coupled with an integrated display, an integrated display (e.g., an LCD display), or other means for viewing data or processing information. One or more interface modules may also be present to support input and output between a user and the computer system 10 through an interface device 12, such as a joystick, keyboard, mouse or data glove. Computer system 10 may also include a network interface (I/O) 14 for bidirectional data communication through one or more, and preferably all, of the various networks (LAN, WAN, Internet, etc.) using communication paths or links known in the art, including wireless connections, ethernet, bus line, Fibre Channel, ATM, standard serial connections, and the like.

Still referring to drawing FIG. 1, computer system 10 includes one or more microprocessors 20 responsible for controlling all aspects of the computer system 10. Thus, microprocessor 20 may be configured to process executable programs and/or communications protocols which are stored in memory 22. Microprocessor 20 is provided with memory 22 in the form of RAM 24 and/or hard disk memory 26 and/or ROM (not shown). As used herein, memory designated for temporarily or permanently storing one or more examinations of EDI data files on hard disk memory 26 or another data storage device in communication with computer system 10 is referred to as user profile database 25.

In one embodiment of the present invention, computer system 10 uses microprocessor 20 and the memory-stored protocols to exchange data with other devices/users on one or more of the networks via Hyper Text Transfer Protocol (HTTP) and Simple Mail Transfer Protocol (SMTP), although other protocols such as File Transfer Protocol (FTP), Simple Network Management Protocol (SNMP), and Gopher document protocol may also be supported. Web page-like interfaces with the remote computers may thus be used. Computer system 10 may further be configured to send and receive HTML- or XML-formatted files. In addition to being linked to a local area network (LAN) or wide area network (WAN), computer system 10 may be linked directly to the Internet via network interface 14 and communication links 18 attached thereto, or be capable of linking directly to a remote computer 50 (as will be discussed further herein).

Computer system 10 will preferably contain executable software programs stored on hard disk memory 26 related to the operation of a Web server. Hard disk memory 26 may also contain specific software programs relating to the operation of analyzing EDI files as well as other programs. Alternatively, a separate hard disk, or other storage device (not shown), may optionally be provided with the requisite software programs for conducting the testing methods as described herein.

Computer system 10 is able to communicate with remote computers 50. This may be accomplished in any suitable fashion. For example, communication may occur over a network 40, which may include the Internet, to which computer system 10 is in operative communication through network interface 14 and communications link 18. Alternatively, computer system 10 may directly communicate with a remote computer 50, using a direct connection 45 in operative connection with network interface 14, such as a direct dial connection over telephone lines, or another suitable connection.

Figure 2:
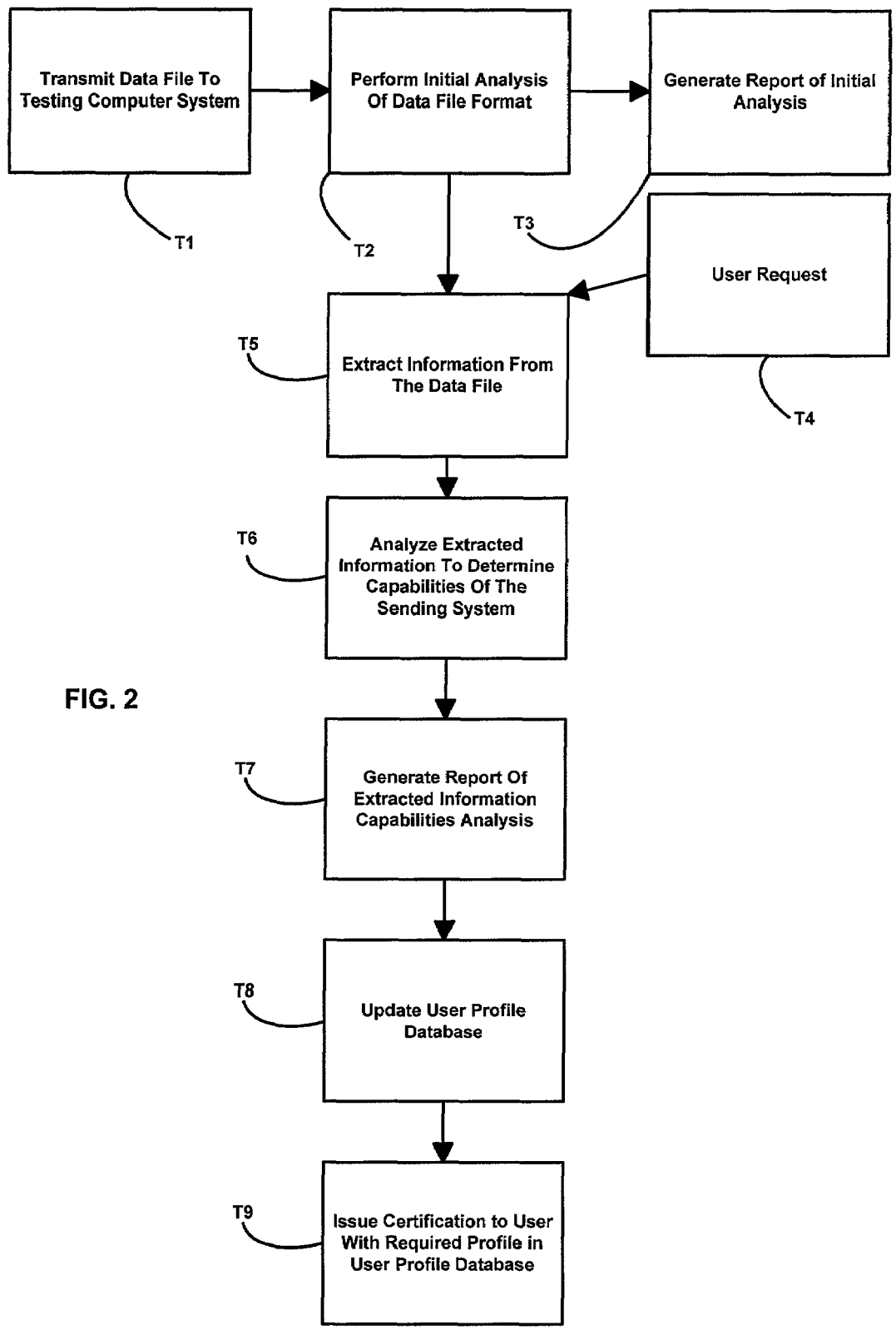
FIG. 2 is a flowchart depicting one possible embodiment of a process for examining the transmission EDI data files and verifying transmission capability, in accordance with one aspect of the present invention.

Turning to drawing FIG. 2, one embodiment of a process of the present invention for examining data file transmissions and verifying the capabilities of the transmitting system is depicted. For the purposes of understanding, this process will be detailed in connection with the system depicted in drawing FIG. 1. It will, of course, be appreciated that the flowchart is illustrative only and, while it depicts only one possible embodiment of a process, that other processes in accordance with the teachings of the present invention are possible, and that any suitable computer system may be used, and all such variations are within the scope of the present invention.

Typically, to initiate the process, a communicative connection is made between a remote computer 50 and the testing computer system 10. This may be accomplished through transfer of the data files on physical magnetic or optical media, or by communicating over the network (which may include the Internet), as by supplying web pages to the remote computer 50 from the testing computer system 10 in response to a user request, by using a modem or other communication device attached to a remote computer 50 to "dial in" or otherwise connect to the testing computer system 10, or as is otherwise known to those of ordinary skill in the art.

Once a connection is established, a data file is transmitted to the testing computer system 10, as depicted in box T1. Typically this occurs in response to a user request. The transmission may be accomplished in any suitable manner, such as by submitting the file through a web page interface transmitted to the remote computer 50, either over the network 40 or a direct connection 45 by the testing system computer 10, by transmitting the file as an e-mail, on magnetic, optical or other physical media, or any other suitable method. An X12-compliant EDI data file may be represented as a string of octets organized inside an X12 electronic "envelope" in groups of "transactions" that contain segments, each segment including composite, simple, or other data elements. Each segment may thus be thought of as containing one or more data fields, each data field containing a piece of information for the EDI transaction. The business needs regulate which data elements are used and how they are organized in the X12 data file. Similarly, an XML file is a structured mechanism for conveying data fields with a business purpose, using a mark-up language different from X12.

Upon receiving the data file, an initial analysis of the file is conducted by the testing computer system 10, as depicted in box T2. The initial analysis checks the format of the data file for compliance with applicable EDI or other coding standards. In one illustrative example, the file is checked for compliance with X12 format standards. Such a data file is examined for valid segments, segment order, element attributes, the presence of numeric values in numeric data elements, appropriate X12 syntax and other requirements of the X12 rules. In another illustrative example of the present invention, the data file is checked for compliance with industry-specific standards, such as those contained in the HIPAA Implementation Guides, earlier incorporated by reference herein. Such an examination would check the data file for appropriate repeat counts, used and unused codes, elements and segments, required or intra-segment situational data elements and values noted via an X12 code or table, and business rules or rules understood at a business level. An analysis of industry-specific standards may be conducted simultaneously with less specific standards and/or may only follow on compliant data files.

As the initial analysis proceeds, the contents of the data file are examined. For an EDI file, the segments are identified and the information in each data field is extracted. A number of analyses may then be performed on the extracted data. These analyses involve analyzing the data extracted from the data file against a series of rules that may be expressed as lines of code in software executed by the microprocessor 20.

Testing against another such set of rules may be referred to as balance testing, i.e., ensuring that numerical values within the data file segments are complete and balance against one another. For example, if the data file is an EDI transaction ordering goods from a supplier, the data reflecting the price of each ordered good should, when totaled, match the summary payment authorization, or summary remittance requirement for the transaction. In the HIPAA implementation example, an EDI transmission will be checked for balanced field totals, record or segment counts, financial balancing of claims or remittance advice, and balancing of summary fields.

Other sets of rules may be incorporated into the system and the testing computer system 10 may examine the data contained within the data file, or extracted therefrom against such rules. For example, in the HIPAA implementation model, the transmitted data files may be examined for valid code values that are specific for each set of code set values (such as Common Procedure Terminology (CPT), the Code of Dental Terminology (CDT3), the National Drug Code (NDC), the International Classification of Diseases $9^{th}$ Edition (ICD9) or others). Another example would be the utilization of specific rules for different types of senders. For example, a distributor that transmits orders for merchandise to a number of manufacturers will transmit substantially different data files from those conveyed by a retailer to a distributor. Transmitted files from a distributor may be compared to a set of distributor rules and those from a retailer to a set of retailer rules. In the HIPAA implementation rules, transmissions from an OB/GYN physician's office may be checked against customized rules, including not making claims for prostate-related conditions or in-patient hospital care. Similarly, transmissions from an ambulance company may be examined against ambulance-specific rules, including making claims for transport, but not making claims for the provision of physician services. Problems related to the specific type of sender or a specific business function may thus be detected in a transmitted file.

Testing against one such set of rules may be referred to as situational testing, i.e., ensuring that relationships between the data file fields are appropriate and that the presence or absence of certain data fields meet the requirements of the specific business situation. These relationships may be expressed as "if, then" logical statements, for example: if data A occurs, then data B must also occur. A large number of such situations present in the HIPAA implementation guides, incorporated by reference herein, may be expressed and examined in this manner. For example, if the data file is a request for payment for an inpatient claim, a date of admission must be present. As another example, if a date of birth is present to identify an adult patient, then the date of treatment must occur after the date of birth. This situational testing allows messages that pass initial examination but are nonsensical due to internal business relationship errors and the specific problems with each such message to be identified.

The analysis is preferably accomplished by a microprocessor 20 analyzing the format of the data file by following a set of instructions maintained in a memory of the testing computer system as software. The instructions may be provided by modifying suitable software to include the desired testing rules.

Once the analysis is completed, a report is then generated, as depicted in box T3. The report details the compliance of the transmitted data file with the applicable EDI standards and business rules. The report may be provided to the user submitting the file as a web page transmitted to the remote computer 50 by the testing computer system 10. Alternatively, the report may be transmitted as an e-mail, printed and conveyed, or by any other suitable method known to those of ordinary skill in the art. It is preferred that the report contain a detailed explanation of any deficiencies in the data file. Upon reviewing the report, a user may determine what deficiencies in files transmitted by the remote computer 50 are present and aid in correcting the problem. A copy of the report may be retained in a memory 22 of the testing computer system 10, or may be deleted upon user request. By providing an automated report of the results of the testing, problems with the formatting of transmitted data files may be corrected prior to having to address business problems that are internal to the data files. It will, of course, be appreciated that, although the single term data file is used in reference to the processes described herein, it is within the scope of the present invention for multiple data files to be conveyed and analyzed or processed to provide more extensive analysis, if desired.

Upon a user request, as depicted in box T4, such as by clicking on an icon or a link on a web page-like generated report, more extensive analysis of the data file is conducted. This analysis involves examining the content of the transmission and extracting information about the capabilities of the sending remote computer 50 from the data file. The analysis begins with the extraction of data as shown in box T5. It will be appreciated that the user request may be optional and the more extensive analysis may automatically begin.

As data is extracted from the data fields of a data file, the testing computer system determines the capabilities of the sending system from the extracted data, as shown in box T6. Information on the aspects of the data file may be stored in an extraction database 30 (FIG. 1) (stored in memory 22) after extraction. As more data files are received and examined by the testing computer system 10, the database is updated. Two types of capability information are maintained in the extraction database 30: the individual transaction-based (e.g., a health care claim) capability information that are the capabilities separately determined from each business transaction transmitted in the data file, and aggregate capability information determined as an aggregate of the individual capabilities extracted from all the transactions in data files transmitted by a single sending remote computer system 50. A report may be generated from the database 30 to provide a snapshot of either the transaction-based or the aggregate capabilities of the sending remote computer system 50 at any time. For example, using the HIPAA implementation model, the individual healthcare claims contained within each claims data file are extracted and evaluated independently for their capabilities. A single file could contain hundreds or thousands of claims, and each claim is typically unrelated to other claims. Therefore, a claims file from a multi-specialty clinic could represent capabilities for multiple specialties, whereas a claims file from an ambulance provider would probably only contain claims for ambulance services. This information is added to the extraction database 30.

The capabilities demonstrated in the data stream with respect to the transactions sent by the remote computer 50 in one or more EDI files are recorded in the database 30 and may be examined at any desired time. For another example, as patient information is contained in data fields, each piece of patient information, such as a surname, consists of a number of characters, the count of the number of characters in each data field may be determined and added to the database, demonstrating the capability to send surnames no longer than a specified maximum length. For another example, as certain data fields may be codified, and the list of possible codes may be extensive, those codes actually used by the sender in the data stream are stored in the database 30, thus permitting the verification of the actual codes used by this trading partner. The demonstrated capability of the remote computer 50 to transmit files with differing field character or with specified code values may be determined at any time.

In another example, the requirements of a particular data file receiver, such as a distributor that receives electronically transmitted orders from a number of retailers, or, in the HIPAA model, a large receiver of EDI transmissions, such as a large insurance payer or claims processor, may provide the tester with its specific requirements for transmissions received from trading partners. The EDI capabilities defined from information extracted from one or more data files from the sender may then be compared against that receiver's specific requirements. This allows the remote computer 50 to be tested against those specific requirements.

The ability to automatically test against a computer system that represents the specific requirements of different receivers allows a user to check the ability of its remote computer system 50 to successfully transmit messages to a particular receiving partner. This allows the sender to test its transmissions and troubleshoot and resolve any items that would be in conflict with that particular receiving partner, without requiring the receiving partner to spend time and effort in identifying those shortcomings. This may be especially advantageous for a receiver that needs to test with a large number of senders in reducing the nonproductive time spent in resolving such issues on the "sending" end.

The specific requirements of any number of receiving partners may be incorporated as rules for the extracted data to be compared with by the testing computer system 10. This allows a sending partner that transmits data from its remote computer system 50 to multiple receivers to examine it's ability to transmit to each one of those receiver systems by testing the same data against all of the receivers' rules and verifying the acceptability of the files by several receivers with a single transmission. Using the HIPAA implementation model, a single transmitted file may be examined for acceptability against the capabilities required by two different receivers, such as different claims processors/payers. For example, a single transmitted file may document one instance of providing service to a patient. Testing may show if the file is acceptable for receipt at both a private insurer, such as a Blue Cross plan, and a government payer, such as Medicare. As changes are made to a remote computer 50 to enable acceptable transmissions with one receiving partner, the effect of those changes on the ability to transmit to another receiving partner may be quantified.

It will be appreciated that the analysis may occur by the retrieval of aggregate information from the extraction database 30 or directly for each transaction in a data file (e.g., a single health care claim in a data file with hundreds of claims) as information is extracted. It will be further appreciated that the analysis may be performed on information extracted from a number of data files at the same time or at different times. Once the analysis of the extracted data and the contents of the data files in relation to the various rule sets is complete, a detailed analysis report is generated, as shown in box T7. This report may be provided to the user in any suitable manner, as discussed previously herein. The results of the analysis are added to the user profile database 25 as shown in box T8. By examining the report, users can make adjustments to their remote computer systems and continue to submit files until problem-free transmission is accomplished.

Following the submission of a desired number of data files that are examined without problems noted, a certification of the ability to transmit compliant data files may be issued to a user for the sending remote computer system 50, as shown in box T9. Where the examination includes comparison to different sets of rules for different receivers, certifications for the different sets of rules may be issued. Under the HIPAA implementation model, for example, a remote computer system 50 may be certified to transmit messages as an ambulance company, or a neonatal care facility, but not for other purposes. Similarly, where requirements for different receivers are expressed as different rule sets, a user may be certified for transmission only to specific receivers. Any rule set may be used and the categories may be even further subdivided. Thus, following successful transmission of a desired number of "clear" files, a remote computer system might be certified to transmit files to Medicare for a chiropractic office, but for no other purpose. The certifications may be limited to only the remote computer system 50 as it is configured at the time the pertinent files are transmitted. Changes to the remote computer system 50, such as addition of components, installation of software, etc., may require the system to recertify.

Figure 3:
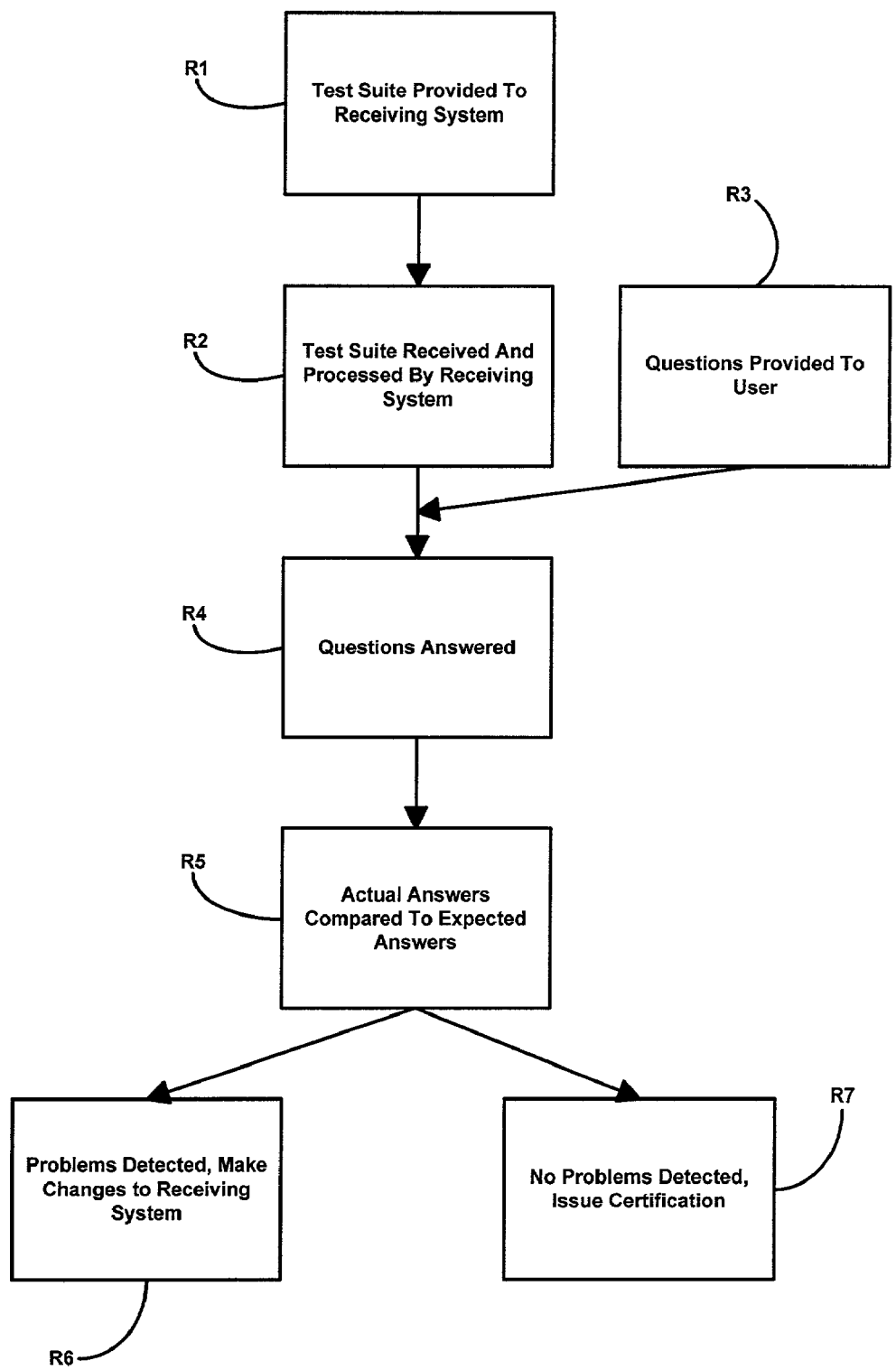
FIG. 3 is a flowchart depicting one possible embodiment of a process for examining the receiving of EDI data files and verifying reception capability, in accordance with one aspect of the present invention.

Turning to drawing FIG. 3, a flowchart depicting a process for examining and certifying a system's ability to receive and process data files is depicted. As shown in box R1, a test suite of data files is provided to a receiving computer. The test suite is one or more known data files, preferably a number of data files, that are provided by a testing computer. The files are transmitted to a remote computer system 50 for receiving and processing. The test suite will typically be transmitted as a number of data packets from the testing computer system 10 to the remote computer system 50 over network 40 or direct connection 45, in order to fully mimic the reception of files from a sending trading partner. This may occur in response to a request submitted via a web page or other interface. It will be appreciated, however, that it is within the scope of the present invention to provide the files in any suitable manner, such as on a computer-readable storage medium (CD-ROM, floppy disk, zip disk, tape, etc.), if desired.

Once provided, the test suite is received and processed by the receiving remote computer system 50, as depicted in box R2. A number of questions related to the specific data in the test suite are provided along with the test data to the user of the receiving remote computer system 50, as shown in box R3. The questions may be provided with the test suite, or may be separately provided at a different time. Once the test suite is processed by the receiver's remote computer system 50, the receiver provides answers to the questions, as depicted in box R4. This may be accomplished by providing answers to the questions through a web page interface to the testing computer system, by e-mailing the answers thereto, or by any other method (faxing, mailing, telephoning, etc., to the source of the test).

Once the answers are received by the source of the test, the answers are compared to a set of expected answers for that test suite, as shown in box R5. This may be accomplished by the testing computer system 10 executing a set of instructions retained in memory 22. By comparing differences between the provided answers and the expected answers, problems in the receipt and correct processing of the files may be identified. Where problems in receiving or processing the test suite are found, the difference between the expected result and the real result obtained by the receiver allows changes to be made to the receiver's remote computer system 50 and the process to be repeated, as shown in box R6. Where test suites are successfully received and processed, being able to produce the correct answers to the questions allows the receiving remote computer system 50 to be approved by the source of the test and a receiving certification may be issued, as shown in box R7.

It will be appreciated that a number of varying test suites may be provided, ensuring new and different data files are included in each iteration of the test suite, in order to provide more variety in the testing of the receiving remote computer 50. Further, any number of differently constructed types of testing suites may be used, each tailored for a different receiving system, allowing receiving computers to be tested, and possibly certified, for receiving transmissions from different types of senders. For example, using the HIPAA model, a receiving remote computer 50 may be tested with a test suite for receiving claims from physicians' offices and tested with a different test suite for receiving hospital claims. Separate certifications for each test suite may also be issued. Test suites may include deliberately defective files to determine the ability of the receiving remote computer to detect and reject such files, or recover from the defects.

Figure 4:
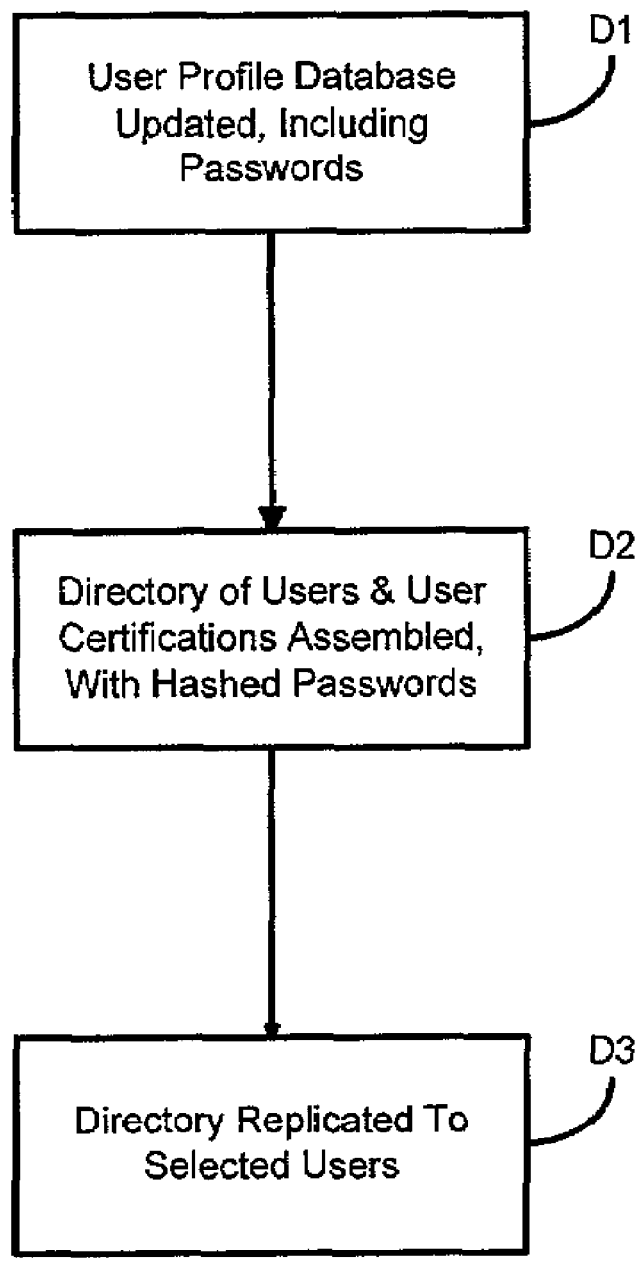
FIG. 4 is a flowchart depicting one embodiment of a process for assembling and replicating a directory from a database of user system capabilities, in accordance with one aspect of the present invention.

As information on the capabilities and certifications of various remote computers 50 is developed with respect to either sending or receiving files, the user profile database 25 is updated in memory 22. The information in the user profile database 25 allows the most current capabilities and certifications of various trading partners to be examined at any point. Turning to FIG. 4, a process for making this information available to trading partners participating in the certification process is depicted.

As shown in box D1, the user profile database 25 is updated as users submit files to the testing computer system or respond to questions associated with the test suites. From the user profile database 25, a directory of users and the capabilities of receiving computer systems may be assembled as shown in box D2. Where the varying users access the testing computer system 10 utilizing an identifier and a password, the password may be included in the directory. Where this is done, it is preferred that the password be presented in "hash" form as the result of a one-way encryption process, rather than a plain text representation of the password in the user database or directory. It will be appreciated that other data fields may be included in the user database or directory, such as demographic information, EDI agreement, restrictions on available transactions, interface protocols, hours of operation, encryption keys, and any other information that is desirable to associate with a user.

The directory may be made available to users of the system by testing computer system 10 acting as a web server and providing the directory to users of the system as a web page interface (using HTTP or another suitable protocol) or by other means. Alternatively, the directory may be replicated on a periodic basis (hourly, daily, weekly, etc.) to certain users, as represented in box D3. For example, using the HIPAA implementation model, the directory or a part thereof may be replicated to large healthcare entities, such as large payers, claims processors, clearinghouses and so forth, or it may be offered to every registered user. It will, of course, be appreciated that the directory as made available may be made available only in part, like a replica that is limited to only list the current certifications of users therein, or may only list users that are currently certified, to protect the confidentiality of users that are resolving issues prior to receiving certifications for their remote computer systems 50.

Utilizing the directory, users may check the certification status of potential trading partners prior to entering into agreements to electronically interchange data therewith. The EDI agreements for users may be accessible via the directory, for example, as an embedded hyperlink, allowing a user to execute the agreements from the directory and check on the other's status. For example, using the HIPAA implementation model, a physician's office may access the directory to discover whether a specific payer is capable of conducting the desired transactions and enter into an EDI agreement with a payer, such as Medicare, by accessing the payer's EDI agreement via the directory. Prior to approving the agreement, the payer may check the directory to ensure the physician's office is currently certified to its capability requirements for the type of EDI services offered by the payer.

Where the directory is replicated to a number of directory users and includes the hashed passwords, selected directory users receiving the directory replicas, such as government payers or private payers, may be provided with the one-way hashing algorithm used for the passwords. This allows the directory to provide users with a "master password" that could be used to access the computer services of any receiver of the directory replica. A requesting user that desires access would provide a user ID and the corresponding password, tied to the directory replica user ID and its corresponding hashed password. The directory replica user performs the one-way encryption on the password presented by the requesting user and compares the resulting hash to that contained in the directory. A match of the two hashes allows the directory replica user to ascertain that the password is correct and to grant the requesting user access to the pertinent services. For example, a physician's office has an EDI agreement with an insurer. To access the physician's account information on-line with that insurer, the physician is required to enter the user ID and password corresponding to the replicated directory entry. The insurer's remote computer system 50 performs the one-way encryption and compares the hashes, verifying the identity of the physician prior to granting access in the insurer's system. When the physician's office changes its password in the master directory, preferably on a regular basis, only the password with the master directory in computer system 10 need be changed, as the change is then replicated to all selected directory users that receive a directory replica. The replication thus provides the hashed password to all directory replica users of the third party tester, eliminating a requesting user's need to individually change its password with a large number of trading partners.

Figure 5:
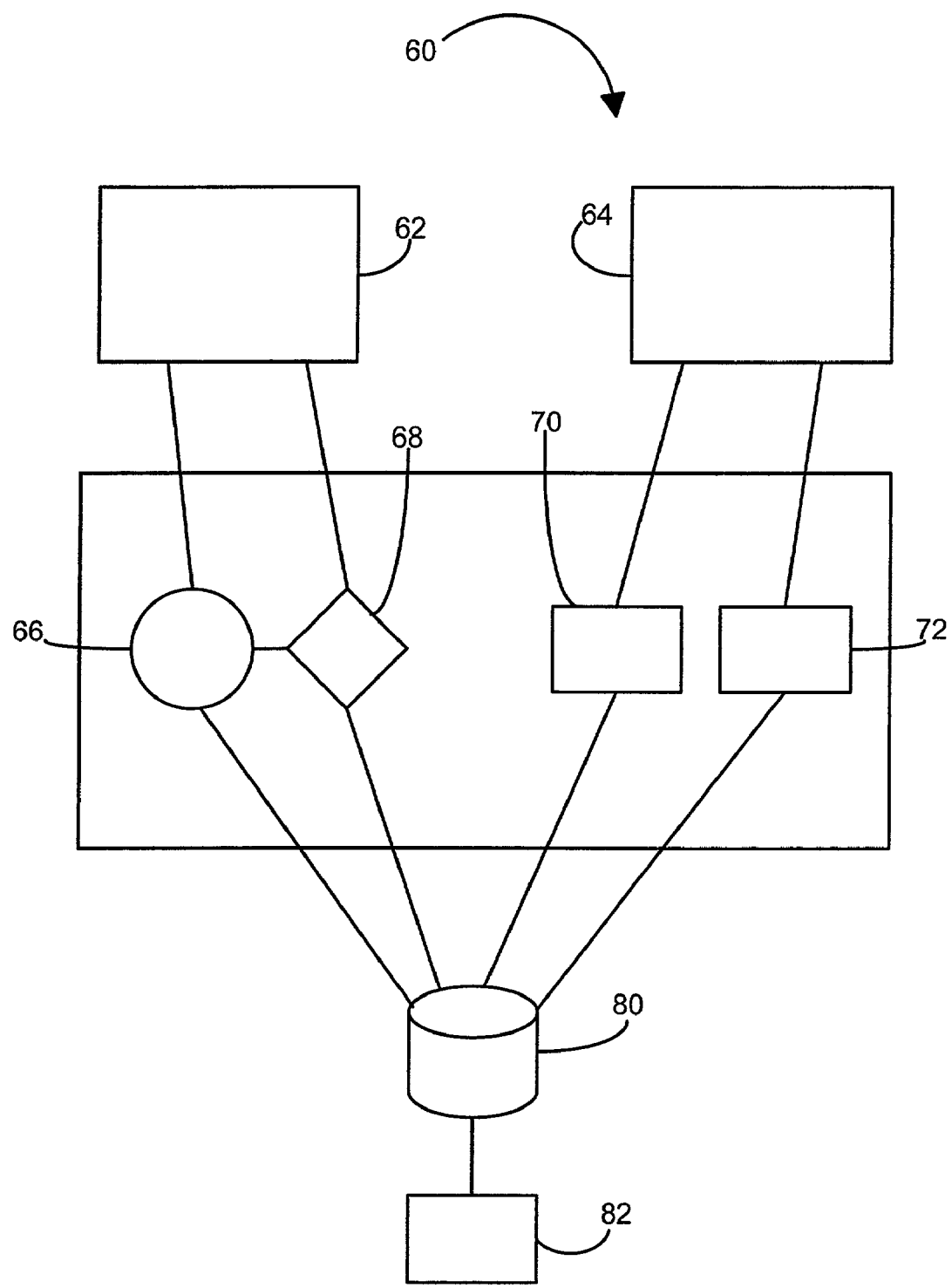
FIG. 5 is a diagram depicting one embodiment of an overall process for testing and certifying EDI trading partners, assembling a database of trading partner information and generating a directory, in accordance with one aspect of the present invention.

Turning to FIG. 5, an overall diagram of a process 60 for testing and certifying EDI trading partners, assembling a database of the testing certification and generating a directory therefrom is depicted. It will be appreciated by those of ordinary skill in the art that the FIG. 5 diagram may be used as a flowchart for implementing computer software to accomplish these steps, using methods known in the art.

An EDI sending partner 62 uploads an EDI file, such as an X12 file, into a testing computer system 10. An analysis of the data file is then performed, as shown by numeral 66. Examples of suitable analyses include syntax checking, balancing, code set and business rule compliance, as discussed previously herein. Upon the completion of a successful analysis 66, a request may be submitted to perform capability extraction 68 upon the data file. Capability extraction 68 occurs data field by data field, and may proceed as previously described herein. Examples of suitable data fields for extraction from the HIPAA guidelines include: Attachment Form Identifier, Attachment Question Number, Billing Provider Address, and Claim Estimated Birth Date. The individual elements may be contained in groups that are extracted and compared for business sense between members thereof. The results of both the analysis 66 and capability extraction 68 are assembled into a central database 80. A potential EDI trading partner 64 makes contact with the testing computer system 10 using a suitable protocol (HTTP, Kermit, SMTP, etc.) as discussed previously herein. An interface, such as a web page-like display, may be created to allow access to requested information from the database 80; this may be a directory 70 of customers, including their capabilities and certifications, or a specially generated listing 72, in response to a request. The specially generated listing 72 will list specific potential trading partners selected from the database 80 based upon their capabilities or certifications compared to a requirements list submitted by the potential EDI trading partner 64, or by comparing the potential EDI trading partner's 64 capabilities with a set of other requirement lists maintained in the database 80. Any submitted requirements list will be maintained in and available from the database 80.

A directory 82 may be replicated from the database for use by selected users, as discussed previously herein, and may include hashed passwords associated with each user.

It will be appreciated by those skilled in the art that the embodiments of the present invention herein described are not intended to limit the invention and that various combinations and modifications of the embodiments of the present invention could be made without departing from the scope thereof and that all such modifications are within the scope of the present invention. For example, it is understood that while the methods and apparatus of the present invention have been described in relation to a remote computer system interacting with a testing computer system using web page-like interfaces, one of skill in the art will recognize that the present invention may be utilized with a wide variety of interfaces and communication protocols.

Thus, while certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. An automated method of testing electronic data-sending capabilities by executing computing instructions on a computer system, comprising:
    receiving a first data transmission from a sending system, said first data transmission containing content comprising at least a first information set in a first data field and a second information set in a second data field;
    examining said first data transmission set for internal consistency between said first information set and said second information set;
    analyzing said first data transmission for compliance with a set of rules;
    extracting at least a first component characteristic of said first information set from said at least a first data field;
    determining if at least one of the first data field and the second data field include at least one code value in a predetermined code set designated for a specific business implementation model; and
    generating a report of the results of the acts of analyzing and determining.

2. The method according to claim 1, wherein said rules are selected from the group consisting of ASC X12 EDI standards, EDIFACT EDI standards and XML EDI standards.

3. The method according to claim 1, wherein said rules comprise HIPAA Implementation Guide requirements.

4. The method according to claim 1, further comprising analyzing said at a least first component characteristic of said first information set to determine a transmission capability of said sending system.

5. The method according to claim 4, further comprising:
    receiving a second data transmission from said sending system, said second data transmission containing content comprising at least a second information set in said at least a first data field;
    analyzing said second data transmission for compliance with said set of rules; and
    extracting at least a first component characteristic of said second information set from said at least a first data field.

6. The method according to claim 5, further comprising analyzing said at least a first component characteristic of said second information set to determine said transmission capability of said sending system.

7. The method according to claim 6, further comprising compiling a database of said at least a first component characteristic of said first information set and said at least a first component characteristic of said second information set to determine a range of said transmission capability of said sending system.

8. The method according to claim 1, further comprising extracting at least a first component characteristic of said at least a second information set from said at least a second data field.

9. The method according to claim 8, further comprising analyzing a relationship between said at least a first component characteristic of said at least a first information set and said at least a first component characteristic of said at least a second information set to determine a capability of said sending system with respect to a first rule of a set of relationship rules.

10. The method according to claim 9, wherein analyzing said relationship to determine a capability with respect to a first rule comprises examining a presence or absence of a second specific element in said at least a second information set, as required by said first rule when said at least a first information set contains a first specific element.

11. The method according to claim 9, wherein analyzing said relationship to determine a capability with respect to a first rule comprises examining data content characteristics of a second specific element in said at least a second transmission set, as required by said first rule when said at least a first transmission set contains a first specific element.

12. The method according to claim 11, wherein analyzing said relationship to determine a capability with respect to a first rule comprises analyzing a relationship between numeric values of said at least a first component characteristic of said at least a first information set and at least a second component characteristic of said at least a second information set.

13. The method according to claim 9, wherein analyzing said relationship is performed upon submission of a separate request for analysis by a user.

14. The method according to claim 1, wherein determining if at least one of the first data field and the second data field include at least one code value comprising testing said first data transmission for valid HIPAA implementation guide code values.

15. An automated method of certifying a remote computer system for transmitting electronic data messages in accordance with a set of standards by executing computing instructions on a computer system, comprising:
    receiving a first data file transmitted by said remote computer system;
    extracting a first data element from a first data field contained in said first data file;
    extracting a second data element from a second data field contained in said first data file;
    analyzing a consistency relationship between said first data element and said second data element;
    determining if at least one of the first data field and the second data field include at least one code value in a predetermined code set designated for a specific business implementation model;
    analyzing said first data file for compliance with a set of rules developed to test compliance with a set of standards comprising predetermined criteria; and
    issuing a certification when said first data file reflects predetermined criteria with respect to said computer system.

16. The method according to claim 15, further comprising:

creating a database entry for said remote computer system containing results of said analysis in a database;

receiving a second data file transmitted by said remote computer system;

analyzing said second data file for compliance with said set of rules developed to test compliance with said standards; and modifying said database entry for said computer system to include results of said analysis of said second data file.

17. The method according to claim 16, wherein said first data file and said second data file are contained in a single transmission transmitted by said computer system.

18. The method according to claim 15, wherein said analysis comprises analyzing a format of said first data file.

19. The method according to claim 18, wherein analyzing a format comprises determining if said first data file complies with ASC X12 EDI format standards.

20. The method according to claim 18, wherein analyzing a format comprises determining if said first data file complies with HIPAA Implementation Guide formatting requirements.

21. The method according to claim 15, wherein analyzing the consistency relationship comprises determining a presence of required information in said second data element when a certain value is present in said first data element.

22. The method according to claim 15, wherein analyzing the consistency relationship comprises defining a mathematical, logical or business relationship.

23. The method according to claim 15, further comprising determining a capability of said remote computer system to place data in said first data field from said first data element.

24. The method according to claim 15, further comprising analyzing an ability of an identified recipient to receive and process said first data file.

25. The method according to claim 15, further comprising generating a report detailing a result of said analysis of said consistency relationship.

26. The method according to claim 25, wherein said report details said results of said analysis with respect to an ability of an identified recipient to receive and process said first and second data files.

27. The method according to claim 16, further comprising creating a directory containing results of said database.

28. The method of claim 27, wherein said directory contains a hashed form of a password associated with said computer system.

29. The method of claim 28, further comprising replicating copies of said directory out to a number of receiving computer systems.

30. The method of claim 29, further comprising furnishing said receiving computer systems with an algorithm of said hashed form of a password.

31. A method of testing electronic data-receiving capabilities, comprising:

conveying to a computer system at least a first data transmission to a receiver, said at least a first data transmission containing at least a first information set in at least a first data field and a second information set in a second data field;

examining said first data transmission set for internal consistency between said first information set and said second information set on said computer system;

determining if at least one of the first data field and the second data field include at least one code value in a predetermined code set designated for a specific business implementation model;

providing said receiver with a set of enquiries to be responded to following processing of said at least a first data transmission;

receiving a set of actual responses to said set of enquiries from said receiver;

comparing said set of actual responses to a predetermined set of desired responses; and analyzing differences between said set of actual responses and said set of desired responses to determine electronic data-receiving capabilities of said receiver.

32. The method according to claim 31, further comprising conveying an additional data transmission to said receiver, said additional data transmission containing at least a first information set in at least a first data field; and providing said receiver with another set of enquiries to be responded to following processing of said at least a first data transmission and said additional data transmission.

33. The method according to claim 31, further comprising compiling a database of said differences.

34. The method according to claim 31, further comprising issuing a certification as to capability to receive data transmissions to said receiver following a successful determination of said electronic data-receiving capabilities of said receiver.

35. The method according to claim 31, wherein conveying said at least a first data transmission comprises conveying data files directed to a specific type of transaction.

36. A computing system for testing EDI sending capabilities, comprising:

a testing computer system configured to:
receive one or more data transmissions containing content comprising at least a first information set in at least a first data field from a sending computer system in communication therewith;

analyze said data transmissions for compliance with a set of transmission rules;

extract at least a first component characteristic of said at least a first information set from said at least a first data field;

extract at least a second information set from a second data field of said data transmissions;

check for consistency between said at least a first information set and said at least a second information set; and determine if at least one of the first data field and the second data field include at least one code value in a predetermined code set designated for a specific business implementation model.

37. The system of claim 36, wherein said testing computer system is in communication with said sending computer system over a network.

38. The system of claim 37, wherein said network comprises the Internet.

39. The system of claim 36, wherein said testing computer system is in communication with said sending computer system via a direct connection.

40. The system of claim 36, wherein said testing computer system is further configured to analyze said data transmissions for compliance with a set of transmission rules selected from the group consisting of ASC X12 EDI standards, EDIFACT EDI standards and XML EDI standards.

41. The system of claim 36, wherein said testing computer system is further configured to analyze said data transmissions for compliance with a set of transmission rules comprising HIPAA Implementation Guide requirements.

42. The system of claim 36, wherein said testing computer system is further configured to analyze said at least a first component characteristic of said at least a first information set to determine a transmission capability of said sending computer system.

43. The system of claim 42, wherein said testing computer system is further configured to compile a database of said at least a first component characteristic of said at least a first information set extracted from said one or more data transmissions to determine a range of said transmission capability of said sending computer system.

44. The system of claim 36, wherein said testing computer system is further configured to analyze a relationship between at least a first component characteristic of said first information set and at least a first component characteristic of a second information set to determine a capability of said sending system with respect to a first rule of a set of relationship rules.

45. A computing apparatus for testing EDI sending capabilities, comprising:
   means for receiving data transmissions comprising at least a first information set in at least a first data field from a sending system;
   means for analyzing said data transmissions for compliance with a set of rules;
   means for extracting at least a first component characteristic of said at least a first information set from said at least a first data field;
   means for extracting at least a second information set from at least a second data field of said data transmissions;
   means for examining consistency between said at least a first information set and said at least a second information set; and
   means for determining if at least one of the first data field and the second data field include at least one code value in a predetermined code set designated for a specific business implementation model.

46. The apparatus of claim 45, further comprising means for analyzing said at least a first component characteristic of said at least a first information set to determine a transmission capability of said sending system.

47. The apparatus of claim 46, further comprising means for compiling a database of said at least a first component characteristic of said at least a first information set from a number of said data transmissions to determine a range of said transmission capability of said sending system.

48. The apparatus of claim 45, further comprising means for extracting at least a first component characteristic of said at least a second information set from said at least second data field.

49. The apparatus of claim 48, further comprising means for analyzing a relationship between said at least a first component characteristic of said at least a first information set and said at least a first component characteristic of said at least a second information set to determine a capability of said sending system with respect to a first rule of a set of relationship rules.

50. A receiving computer system for certifying a computer system for transmitting EDI messages in accordance with a set of EDI standards, the receiving computer system comprising:
   means for receiving data files transmitted by said computer system;
   means for analyzing said data files for compliance with a set of rules developed to test compliance with said EDI standards;
   means for extracting a first data element from a first data field contained in said data files;
   means for extracting a second data element from a second data field contained in said data files;
   means for analyzing a consistency relationship between said first data element and said second data element;
   means for determining if at least one of the first data field and the second data field include at least one code value in a predetermined code set designated for a specific business implementation model;
   means for creating a database entry in a database for said computer system containing results of an analysis; and
   means for issuing a certification when said database reflects predetermined criteria with respect to said computer system.

51. The system of claim 50, wherein said means for analyzing said data files comprises means for analyzing a format of a first data file.

52. The system of claim 50, wherein said means for analyzing a consistency relationship comprises means for determining a presence of required information in said second data element when a certain value is present in said first data element.

53. The system of claim 50, wherein said means for analyzing a consistency relationship comprises means for examining data content characteristics of said second data element for specific data content characteristics required when a certain value is present in said first data element.

54. The system of claim 50, wherein said means for analyzing a consistency relationship comprises means for defining a mathematical relationship between said first and second data elements.

55. The system of claim 50, further comprising means for generating a report detailing a result of said analysis of said consistency relationship.

56. The system of claim 50, further comprising means for determining a capability of said computer system to place data in said first data field from said first data element.

57. The system of claim 50, further comprising means for analyzing an ability of an identified potential recipient to receive and process said data files.

58. The system of claim 50, further comprising means for creating a directory containing results of said database.

59. The system of claim 58, further comprising means for hashing a password associated with said computer system in said directory.

60. The system of claim 59, further comprising means for replicating copies of said directory out to a number of receiving computer systems.

61. The system of claim 60, further comprising means for furnishing said receiving computer systems with an algorithm of said hashing a password.

62. A system of testing electronic data-receiving capabilities, comprising:
   means for conveying at least a first data transmission to a receiver, said at least a first data transmission containing at least a first information set in at least a first data field and a second information set in a second data field to a computer system;
   means for examining said first data transmission set for internal consistency between said first information set and said second information set on said computer system;
   means for determining if at least one of the first data field and the second data field include at least one code value in a predetermined code set designated for a specific business implementation model;

means for providing said receiver with a set of enquiries to be responded to following processing of said at least a first data transmission;

means for receiving a set of actual responses to said set of enquiries from said receiver;

means for comparing said set of actual responses to a predetermined set of desired responses; and means for analyzing differences between said set of actual responses and said predetermined set of desired responses to determine said electronic data-receiving capabilities of said receiver.

63. The system of claim 62, further comprising means for conveying an additional data transmission to said receiver, said additional data transmission containing at least a first information set in at least a first data field; and means for providing said receiver with a set of enquiries to be responded to following processing of said at least a first data transmission and said additional data transmission.

64. The system of claim 62, further comprising means for compiling a database of said differences.

65. The system of claim 62, further comprising means for issuing a certification as to capability to receive data transmissions to said receiver following a successful determination of said electronic data-receiving capabilities of said receiver.

66. A process for matching EDI trading partners, comprising:

analyzing on a computer system, data files provided by trading partners comprising examining said data files for internal consistency between a first information set and a second information set within said data files;

determining if at least one of the first information set and the second information set include at least one code value in a predetermined code set designated for a specific business implementation model;

assembling a database of EDI capabilities of a number of trading partners from results of analyzing data files;

assembling a list of trading partners from the database meeting selected criteria in response to a request submitted by a user; and providing said list of trading partners meeting selected criteria to said user as potential trading partners for the user.

67. The process according to claim 66, wherein analyzing data files provided by said potential trading partners comprises analyzing the syntax of said data files.

68. The process according to claim 66, wherein analyzing data files provided by said potential trading partners comprises analyzing said data files against a set of business rules.

69. The process according to claim 66, wherein analyzing data files provided by said potential trading partners comprises identifying EDI capabilities from said data files.

70. The process according to claim 66, the selected criteria comprises requirements submitted by said user.

71. The process according to claim 70, further comprising retaining said requirements submitted by said user in said database.

72. A system for matching EDI trading partners, comprising:

means for analyzing on a computer system data files provided by trading partners comprising examining said data files for internal consistency between a first information set and a second information set within said data files;

means for determining if at least one of the first information set and the second information set include at least one code value in a predetermined code set designated for a specific business implementation model;

means for assembling a database of EDI capabilities of said number of trading partners from results of analyzing the data files;

means for assembling a list of trading partners meeting selected criteria in response to a request submitted by a user; and means for providing said list of trading partners meeting selected criteria to said user as potential trading partners.

73. The system of claim 72, wherein said means for analyzing data files provided by said trading partners further comprises means for analyzing the syntax of said data files.

74. The system of claim 72, wherein said means for analyzing data files provided by said trading partners further comprises means for analyzing said data files against a set of business rules.

75. The system of claim 72, wherein said means for analyzing data files provided by said trading partners further comprises means for identifying EDI capabilities from said data files.

76. The system of claim 72, wherein said means for assembling a list of trading partners meeting selected criteria comprises means for assembling a list of trading partners meeting requirements submitted by said user.

77. The system of claim 76, further comprising means for retaining said requirements submitted by said user in said database.

* * * * *

UNITED STATES PATENT AND TRADEMARK OFFICE
CERTIFICATE OF CORRECTION

| | | |
|---|---|---|
| PATENT NO. | : 7,376,708 B2 | Page 1 of 1 |
| APPLICATION NO. | : 10/062980 | |
| DATED | : May 20, 2008 | |
| INVENTOR(S) | : Pedro Zubeldia, Travis Stickwell and Jeff Compas | |

It is certified that error appears in the above-identified patent and that said Letters Patent is hereby corrected as shown below:

On the title page:
In ITEM (56) References Cited, U.S. PATENT DOCUMENTS, in the sixth reference down, change "Nakamura et al." to --Hirashima et al.--

COLUMN 3,    LINE 34,    change "System" to --Systems--

CLAIM 70,    COLUMN 20,  LINE 4,    after "66," and before "the" insert --wherein--

Signed and Sealed this

Thirtieth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,376,708 B2 Page 1 of 1
APPLICATION NO. : 10/062980
DATED : May 20, 2008
INVENTOR(S) : Pedro Zubeldia, Travis Stockwell and Jeff Compas It is certified that error appears in the above-identified patent and that said Letters Patent is hereby corrected as shown below:

On the title page:
In ITEM (56) References Cited, U.S. PATENT DOCUMENTS, in the sixth reference down, change "Nakamura et al." to --Hirashima et al.--

COLUMN 3,    LINE 34,      change "System" to --Systems--

CLAIM 70,    COLUMN 20,  LINE 4,      after "66," and before "the" insert --wherein--

This certificate supersedes the Certificate of Correction issued December 30, 2008.

Signed and Sealed this

Sixteenth Day of February, 2010

David J. Kappos
*Director of the United States Patent and Trademark Office*